(12) United States Patent
Shirasaka

(10) Patent No.: US 10,050,485 B2
(45) Date of Patent: Aug. 14, 2018

(54) STATOR, AND MOTOR AND COMPRESSOR HAVING THE STATOR

(71) Applicant: DAIKIN INDUSTRIES, LTD., Osaka-shi, Osaka (JP)

(72) Inventor: Hiroki Shirasaka, Kusatsu (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 15/566,607

(22) PCT Filed: Apr. 15, 2016

(86) PCT No.: PCT/JP2016/062082
§ 371 (c)(1),
(2) Date: Oct. 13, 2017

(87) PCT Pub. No.: WO2016/167338
PCT Pub. Date: Oct. 20, 2016

(65) Prior Publication Data
US 2018/0131246 A1    May 10, 2018

(30) Foreign Application Priority Data

Apr. 16, 2015 (JP) ................................. 2015-084404

(51) Int. Cl.
*H02K 1/00* (2006.01)
*H02K 3/28* (2006.01)
(Continued)

(52) U.S. Cl.
CPC .............. *H02K 3/28* (2013.01); *F04B 39/14* (2013.01); *H02K 1/14* (2013.01); *H02K 1/16* (2013.01);
(Continued)

(58) Field of Classification Search
CPC .. H02K 2203/12; H02K 2203/06; H02K 3/46; H02K 15/095; H02K 3/28; H02K 3/345; H02K 3/34; H02K 3/30
(Continued)

(56) References Cited

U.S. PATENT DOCUMENTS 7,701,102 B2 * 4/2010 Amano ................... H02K 3/522
310/179
8,847,457 B2 * 9/2014 Yoshida ................. H02K 3/522
29/596
(Continued)

FOREIGN PATENT DOCUMENTS

| CN | 104218698 A | 12/2014 |
|---|---|---|
| JP | 3824001 B2 | 9/2006 |
| JP | 2013-94038 A | 5/2013 |

OTHER PUBLICATIONS

International Preliminary Report of corresponding PCT Application No. PCT/JP2016/062082 dated Oct. 26, 2017.
(Continued)

*Primary Examiner* — Thanh Lam
(74) *Attorney, Agent, or Firm* — Global IP Counselors, LLP

(57) ABSTRACT

A stator includes a core having inwardly extending teeth, an insulator placed on an end surface of the core, coil windings wound the teeth, outgoing lines extending from both ends of the coil windings, and a yarn securing the outgoing lines to the insulator. The insulator has an outer wall surrounding a central axis and erected to upwardly extend from the end surface, a plurality of teeth cover portions radially inwardly extending from the outer wall, a plurality of inner walls erected at an end portions of the teeth cover portions, and at least one projection portion. The coil windings are placed between the outer wall and corresponding inner walls. At least one passage portion is formed in the outer wall to pass
(Continued)

the yarn. The projection portion spaces the outgoing lines from the coil windings and secures the outgoing lines, and radially inwardly extends from the outer wall.

19 Claims, 17 Drawing Sheets

(51) Int. Cl.
 *H02K 3/18* (2006.01)
 *H02K 1/16* (2006.01)
 *H02K 5/22* (2006.01)
 *H02K 1/27* (2006.01)
 *F04B 39/14* (2006.01)
 *H02K 1/14* (2006.01)

(52) U.S. Cl.
 CPC ............. *H02K 1/2713* (2013.01); *H02K 3/18* (2013.01); *H02K 5/225* (2013.01)

(58) Field of Classification Search
 USPC .................... 310/194, 184, 198, 214–215
 See application file for complete search history.

(56) References Cited

U.S. PATENT DOCUMENTS

| 2009/0102307 | A1 | | 4/2009 | Amano | |
|---|---|---|---|---|---|
| 2012/0104893 | A1 | * | 5/2012 | Kitaori | ................... H02K 3/522 |
| | | | | | 310/195 |
| 2014/0145544 | A1 | * | 5/2014 | Kodani | ................... H02K 3/12 |
| | | | | | 310/208 |
| 2015/0035397 | A1 | * | 2/2015 | Okinaga | ................... H02K 3/28 |
| | | | | | 310/71 |
| 2018/0091014 | A1 | * | 3/2018 | Shirasaka | ................ H02K 3/38 |

OTHER PUBLICATIONS

International Search Report of corresponding PCT Application No. PCT/JP2016/062082 dated Jul. 19, 2016.
European Search Report of corresponding EP Application No. 16 78 129.9 dated May 18, 2018.

* cited by examiner

STATOR, AND MOTOR AND COMPRESSOR HAVING THE STATOR

CROSS-REFERENCE TO RELATED APPLICATIONS

This U.S. National stage application claims priority under 35 U.S.C. § 119(a) to Japanese Patent Application No. 2015-084404, filed in Japan on Apr. 16, 2015, the entire contents of which are hereby incorporated herein by reference.

TECHNICAL FIELD

The present invention relates to a stator as well as a motor and a compressor having the stator.

BACKGROUND ART

A motor has a stator and a rotor arranged in an inner cavity of this stator. The stator includes a stator core and an insulator placed on an end surface thereof. A plurality of teeth for winding coil windings is formed in the stator core. Outgoing lines extending from both ends of each of the coil windings extend for a long distance, and finally reach mutual connection points or power terminals. These long outgoing lines extend around and in the vicinity of a plurality of coils as disclosed in JP-B-3824001, for example.

SUMMARY

Technical Problem

In order to prevent the motor from being affected by vibration and the like, the extending outgoing lines are tied and secured relative to the insulator with a yarn. Since this tying operation is a complicated process, it may he manually performed. One example of a specific sequence of the tying operation is performed as described below. Initially, an operator leads the yarn using a dedicated needle so that the yarn will pass between the outgoing lines and the coil windings. Next, the operator uses the needle to pass the yarn through a hole disposed in the insulator or engages the yarn in a hook-shaped portion disposed in the insulator. Lastly, the operator ties the yarn. During this operation, the operator may accidentally puncture the outgoing lines or the coil windings with the needle, thereby causing a fracture of an insulation covering or an insulation coating disposed thereon. Therefore, the tying operation of outgoing lines needs effort, time, and attention.

An object of the present invention is to facilitate a tying operation of outgoing lines in order to reduce the occurrence of a defective product during the manufacture of a motor to enhance a production efficiency.

Solution to Problem

A stator according to a first aspect of the present invention has a central axis. The stator comprises a core, an insulator, a plurality of coil windings, outgoing lines, and a yarn. The core has a plurality of teeth radially inwardly extending toward the central axis. The insulator is placed on an end surface of the core. The coil windings are each wound around one of the teeth. The outgoing lines extend from both ends of each of the coil windings. The yarn secures the outgoing lines to the insulator. The insulator has an outer wall, a plurality of teeth cover portions, and a plurality of inner walls. The outer wall surrounds the central axis and is erected in such a way as to upwardly extend from the end surface. The teeth cover portions radially inwardly extend from the outer wall toward the central axis. The inner walls are each erected at an end portion of each of the teeth cover portions. The coil windings are placed between the outer wall and the corresponding inner walls. At least one passage portion is formed in the outer wall. The at least one passage portion passes the yarn. The insulator further has at least one projection portion. The at least one projection portion spaces the outgoing lines from the coil windings and secures the outgoing lines. The at least one projection portion radially inwardly extends from the outer wall.

With this configuration, the projection portion spaces the outgoing lines from the coil windings. Therefore, a tying operation of the outgoing lines is facilitated, which is able to reduce insulation failure due to damage to the outgoing lines and/or the coil windings.

A stator according to a second aspect of the present invention is the stator according to the first aspect, in which the "at least one passage portion" as previously mentioned includes a plurality of passage portions. The "at least one projection portion" as previously mentioned includes a plurality of projection portions.

With this configuration, the passage portions and the projection portions are present. Therefore, the outgoing lines are able to be tied at a plurality of locations, and the outgoing lines are thus further secured.

A stator according to a third aspect of the present invention is the stator according to the second aspect, in which each of the projection portions is disposed above any one of the passage portions.

With this configuration, each projection portion is disposed above one of the passage portions. Therefore, a location where the outgoing lines rest on the projection portion is able to be secured with the yarn passing through the passage portion.

A stator according to a fourth aspect of the present invention is the stator according to any one of the first to third aspects, in which a notch for engaging with the yarn is disposed at a distal end of the projection portion.

With this configuration, the notch engaging with the yarn is formed in the projection portion. Therefore, the detachment of the yarn from the projection portion is able to be reduced.

A stator according to a fifth aspect of the present invention is the stator according to any one of the first to fourth aspects, in which a notch for engaging with the yarn is disposed at a location above the passage portion in the outer wall.

With this configuration, the notch engaging with the yarn is formed in the vicinity of the passage portion in the outer wall. Therefore, the misalignment of the yarn relative to its secured position is able to be reduced.

A stator according to a sixth aspect of the present invention is the stator according to any one of the first to fifth aspects, in which the projection portion is disposed between two adjacent teeth cover portions of the teeth cover portions as seen from above.

With this configuration, the projection portion is disposed between the two adjacent teeth cover portions. Therefore, low is the likelihood of the interference of the projection portion with the movement of winding nozzles for winding the coil windings around the teeth.

A stator according to a seventh aspect of the present invention is the stator according to any one of the first to fifth aspects, in which the projection portion is disposed in such a way as to at least partly overlap one of the teeth cover portions as seen from above.

With this configuration, the projection portion is disposed above one of the teeth cover portions. Therefore, in the case where the stator is used in a motor mounted in a compressor of an air conditioner, the hindrance to the flow of fluid refrigerant by the projection portion is able to be reduced.

A stator according to an eighth aspect of the present invention is the stator according to any one of the first to seventh aspects, in which the projection portion has an upwardly projecting sectional shape.

With this configuration, the sectional shape of the projection portion upwardly projects. Therefore, strength of the projection portion is increased more than that of a flat-shaped projection portion.

A stator according to a ninth aspect of the present invention is the stator according to the eighth aspect, in which the sectional shape is an arc, an ellipsoid arc, or a trapezoid.

With this configuration, specific shapes of the projection portion having strength are determined.

A stator according to a tenth aspect of the present invention is the stator according to any one of the first to ninth aspects, in which the passage portion has a circular, an elliptical, or a triangular shape.

With this configuration, specific shapes of the passage portion are determined.

A motor according to an eleventh aspect of the present invention comprises the stator and a rotor. The stator is the stator according to any one of the first to tenth aspects. The rotor magnetically interacts with the stator.

With this configuration, the motor has a stator according to the present invention. Therefore, the assembly of the motor is facilitated, which is able to reduce fractures of parts.

A compressor according to a twelfth aspect of the present invention comprises the motor, a shaft, a fluid compression mechanism, and a pressure vessel. The motor is the motor according to the eleventh aspect. The shaft is allowed to rotate by the motor. The fluid compression mechanism compresses fluid with the rotation of the shaft. The pressure vessel houses the motor, the shaft, and the fluid compression mechanism.

With this configuration, the compressor has the motor according to the present invention. Therefore, the assembly of the compressor is facilitated, which is able to reduce fractures of parts.

Advantageous Effects of Invention

The stator according to the first aspect of the present invention is able to reduce the insulation failure due to damage to the outgoing lines and/or the coil windings.

The stator according to the second or third aspect of the present invention further secures the outgoing lines.

The stator according to the fourth or fifth aspect of the present invention is able to reduce the misalignment of the yarn relative to its secured position.

The stator according to the sixth aspect of the present invention lowers the likelihood of the hindrance to the movement of winding nozzles.

The stator according to the seventh aspect of the present invention lowers the likelihood of the hindrance to the flow of fluid refrigerant.

The stator according to the eighth aspect of the present invention increases the strength of the projection portion.

The stator according to the ninth or tenth aspect of the present invention is provided with the insulator of which specific designs are presented.

The motor according to the eleventh aspect of the present invention is readily assembled.

The compressor according to the twelfth aspect of the present invention is readily assembled.

DESCRIPTION OF EMBODIMENTS

<First Embodiment>
(1) Overall Configuration

Figure 1:
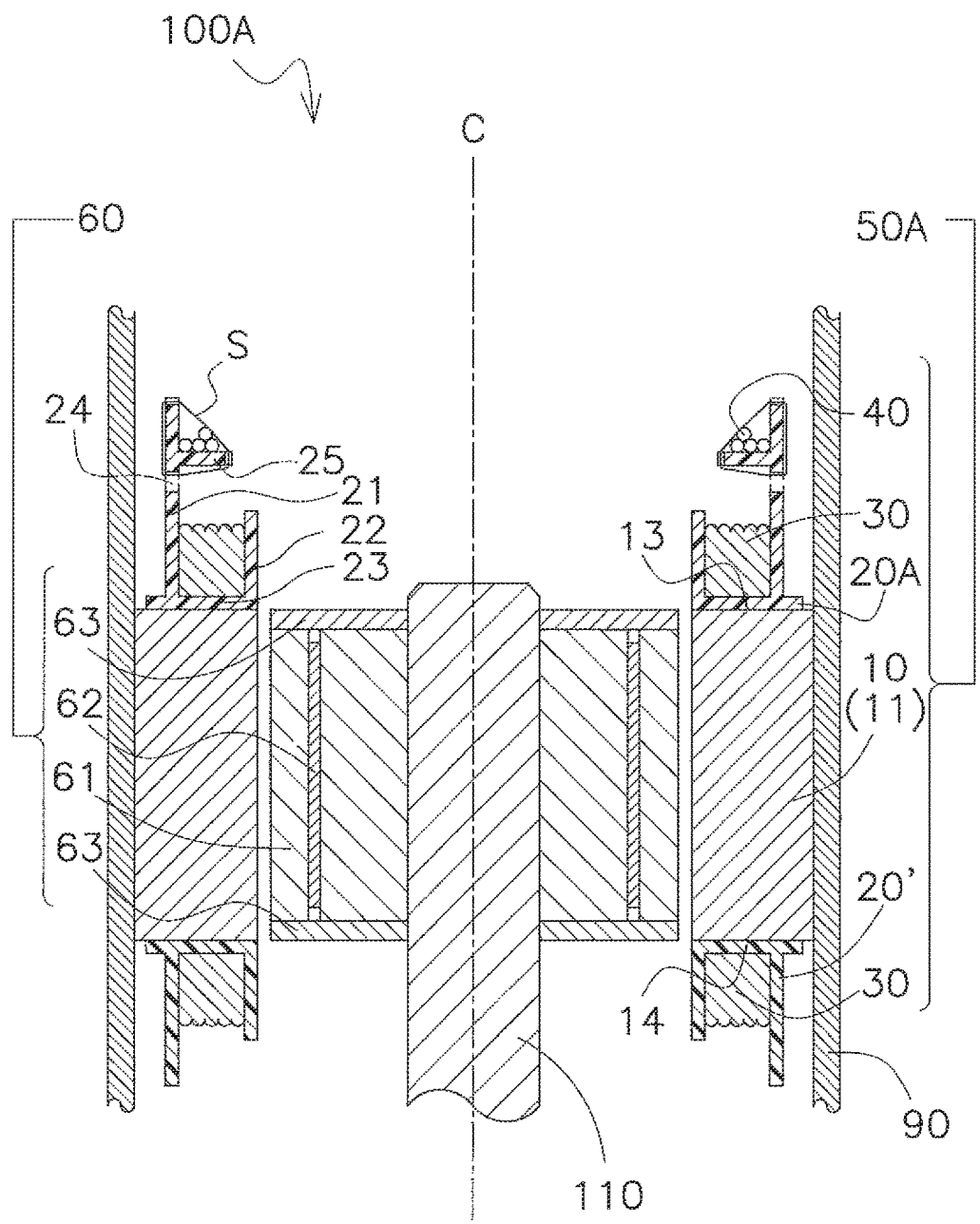
FIG. 1 is a sectional view of a motor 100A according to a first embodiment of the present invention.

FIG. 1 is a sectional view of a motor 100A according to a first embodiment of the present invention. The motor 100A is provided with a stator 50A attached to a casing 90 and a rotor 60 attached to a shaft 110. The stator 50A is cylindrically shaped and disposed around the periphery of the rotor 60. The stator 50A and the rotor 60 magnetically interact with each other to allow the rotor 60 to rotate about a central axis C together with the shaft 110.

(2) Detailed Configuration (2-1) Stator 50A

As shown in FIG. 1, the stator 50A is provided with a stator core 10, an upper insulator 20A, a lower insulator 20', coil windings 30, outgoing lines 40, and a yarn S.

Figure 2:
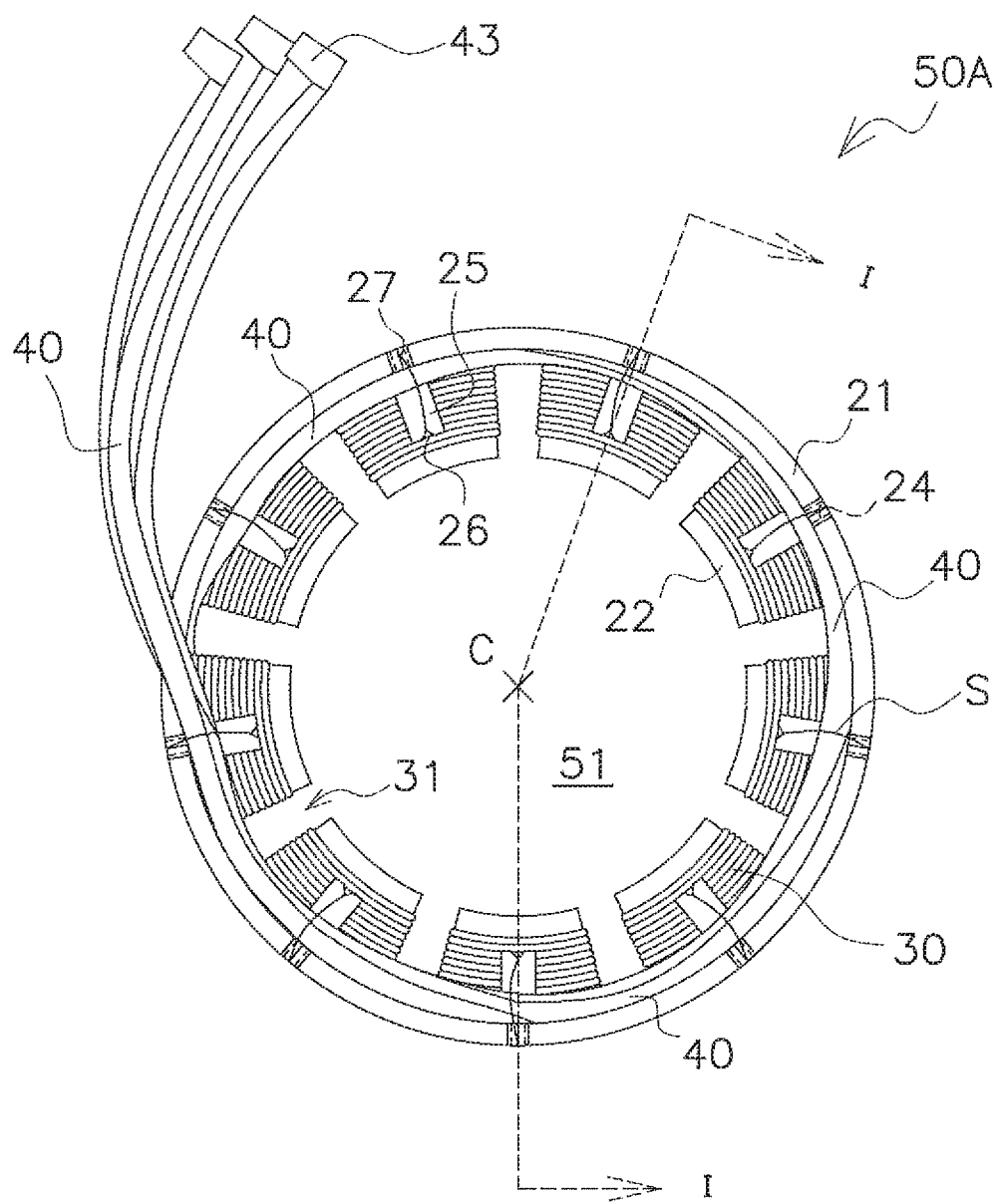
FIG. 2 is a plan view of a stator 50A of the motor according to the first embodiment of the present invention.

FIG. 2 is a plan view of the stator 50A. A cavity 51 for housing the rotor 60 is formed in the stator 50A. The cavity 51 includes the central axis C of the stator 50A. The plane along the line I-I in this figure corresponds to the portion of the stator 50A in the sectional view of FIG. 1.

(2-1-1) Stator Core 10

Figure 3:
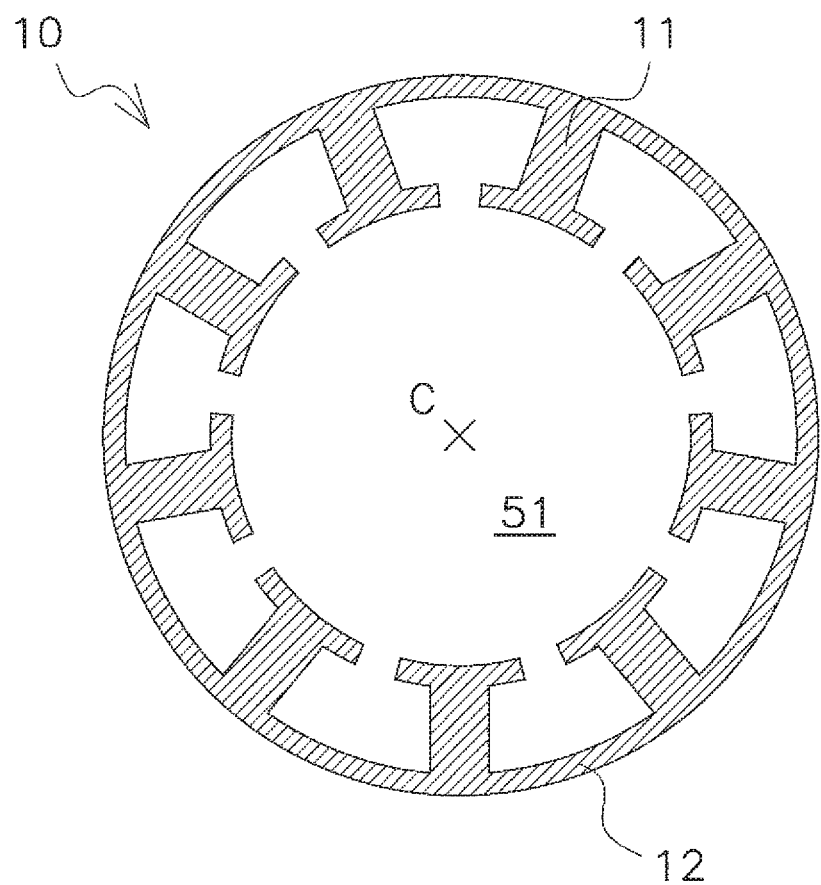
FIG. 3 is a plan view of a stator core 10 of the motor according to the first embodiment of the present invention.

FIG. 3 is a plan view of the stator core 10. The stator core 10 is composed of a laminated steel sheet, for example, and has a cylindrical portion 12 and nine teeth 11 extending from the cylindrical portion 12 toward the central axis C.

(2-1-2) Upper Insulator 20A

Figure 4:
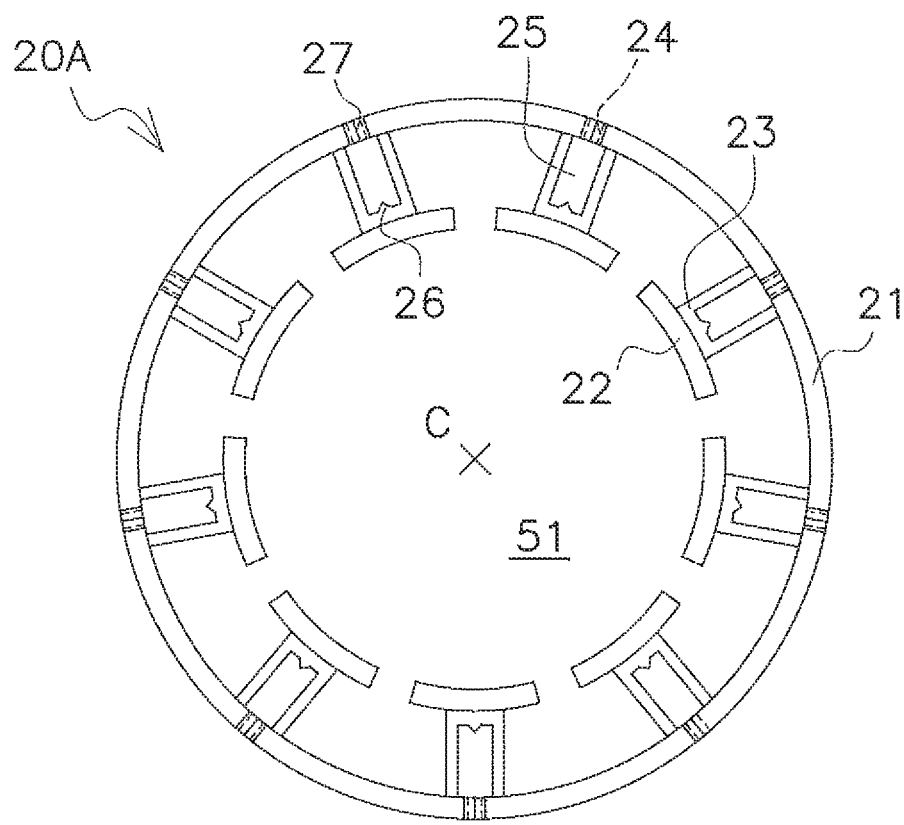
FIG. 4 is a plan view of an insulator 20A of the motor according to the first embodiment of the present invention.

The upper insulator 20A as shown in FIG. 1 is disposed on an upper end surface 13 of the stator core 10, and is made of a resin, for example, FIG. 4 is a plan view of the insulator 20A. The insulator 20A has a cylindrical outer wall 21, a plurality of teeth cover portions 23 extending from the outer wall 21 toward the central axis C, and inner walls 22 which are each disposed at a distal end of each of the teeth cover portions.

Furthermore, the insulator 20A has a plurality of projection portions 25 extending from the outer wall 21 toward the central axis C.

Figure 5:
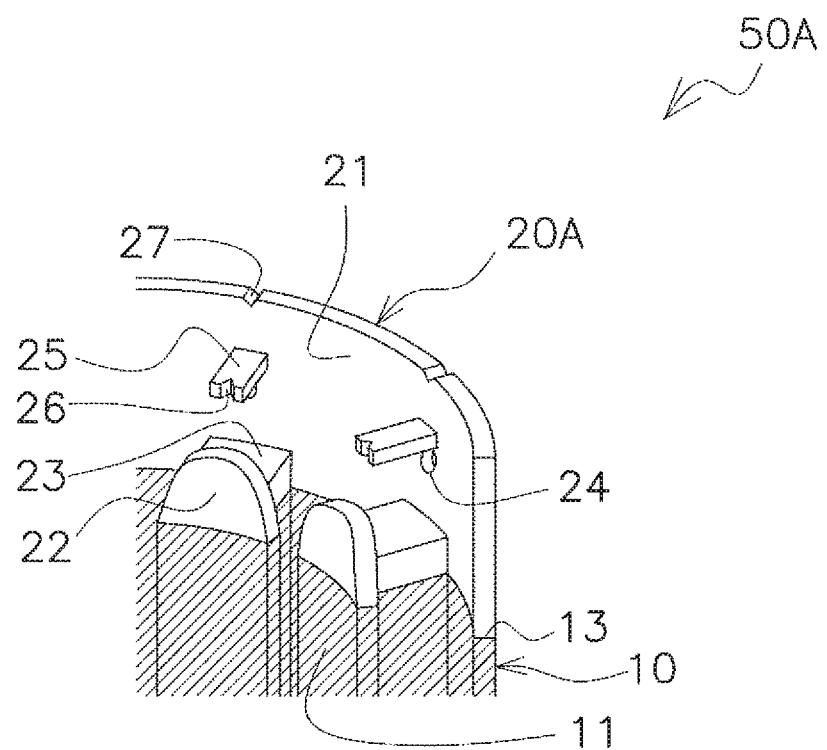
FIG. 5 is a perspective view of the insulator 20A placed on the stator core 10.

FIG. 5 shows the insulator 20A placed on the stator core 10. A portion of each of the teeth 11 on the upper end surface 13 of the stator core 10 is covered with an associated inner wall 22 and teeth cover portion 23.

Each of the projection portions 25 is located above the corresponding teeth cover portion 23, and a notch 26 is disposed at a distal end of each projection portion 25.

A passage portion 24 is disposed at a location between each projection portion 25 and each of the teeth cover portions 23 in the outer wall 21. The passage portion 24 passes the later-described yarn S and allows the inside and the outside of the outer wall 21 to communicate with each other. In the present embodiment, the passage portion 24 is formed as a hole.

A notch 27 is disposed at a location at the upper end of the outer wall 21 corresponding to a base of each projection portion 25.

(2-1-3) Lower Insulator 20'

The lower insulator 20' as shown in FIG. 1 is disposed on a lower end surface 14 of the stator core 10, and is made of a resin, for example. The lower insulator 20' does not especially have a function of restraining the outgoing lines 40.

(2-1-4) Coil Winding 30

As shown in FIG. 2, the stator 50A has the nine coil windings 30, the number of which is the same as that of the teeth 11.

As shown in FIG. 1, each of the coil windings 30 is wound around one of the teeth cover portions 23 of the upper insulator 20A, one of the teeth 11 of the stator core 10, and one of teeth cover portions of the lower insulator 20'.

Figure 6:
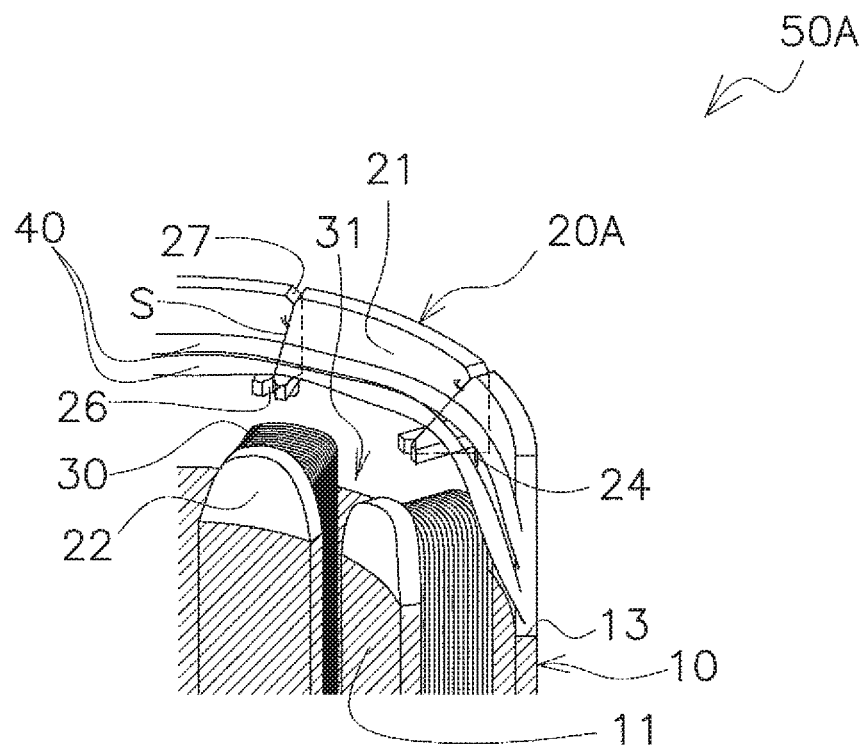
FIG. 6 is a perspective view of the stator 50A of the motor according to the first embodiment of the present invention.

FIG. 6 shows the stator 50A to which the coil windings 30 are attached. The coil windings 30 pass on the corresponding teeth cover portions 23 (FIG. 5) and between the outer wall 21 and the corresponding inner walls 22.

Figure 7:
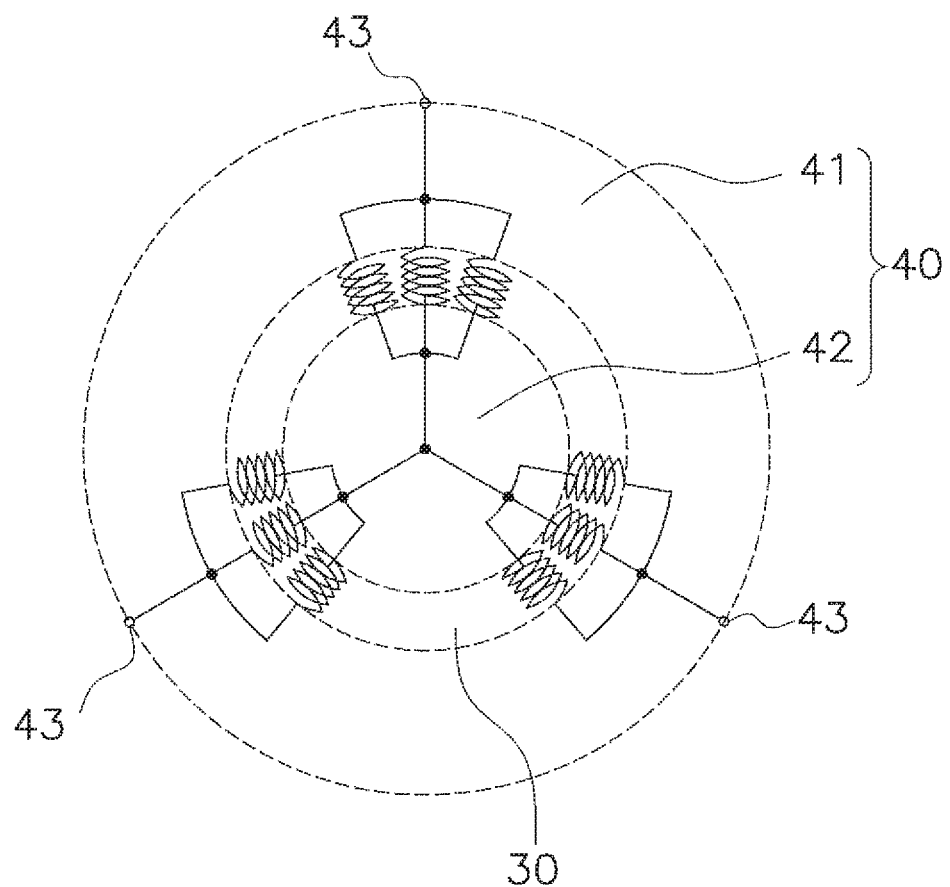
FIG. 7 is a diagram of an electrical circuit of the stator 50A of the motor according to the first embodiment of the present invention.

FIG. 7 shows an electrical circuit of the stator 50. The nine coil windings 30 constitute three phases. Each of the phases is made of three coil windings 30 connected in parallel.

(2-1-5) Outgoing Line 40

As shown in FIG. 7, the outgoing lines 40 extend from both ends of all of the coil windings 30. One outgoing line 40 is connected to any one of the other outgoing lines 40. Among these outgoing lines 40, a location connected to a terminal 43 for applying an exciting current is referred to as a power line 41, and a location connected to all of the coil windings 30 at one end is referred to as a neutral line 42. The outgoing lines 40 may have a portion covered with an insulation covering or a portion on which an insulation coating is applied.

(2-1-6) Yarn S

As shown in FIG. 6, the outgoing lines 40 rest on the projection portions 25, and are tied with the yarn S passing through the passage portion 24 to be restrained. The yarn S engages with the corresponding notch 26 at a distal end of the projection portion 25 and the corresponding notch 27 at the upper end of the outer wall 21 to be constrained.

(2-2) Rotor 60

As shown in FIG. 1, the rotor 60 is provided with a rotor core 61, permanent magnets 62, and upper and lower end plates 63 two in total.

The rotor core 61 is composed of a laminated steel sheet, for example.

The permanent magnets 62 torn poles and are housed in through holes disposed in the rotor core 61.

The two end plates 63 cover the upper surface and the lower surface of the rotor core 61 to prevent the permanent magnets 62 from being detached from the through holes of the rotor core 61.

(3) Assembly of Stator 50A

The stator 50A is assembled in the sequence as described below.

Initially, the upper insulator 20A and the lower insulator 20' are, respectively, placed on the upper end surface 13 and the lower end surface 14 of the stator core 10.

Next, a conductor wire is wound around each of the teeth 11 and its associated teeth cover portion 23 so that the coil windings 30 will be made.

Next, the outgoing lines 40 extending from both ends of each of the coil windings 30 are led by an operator and rested on the projection portions 25.

Figure 8A:
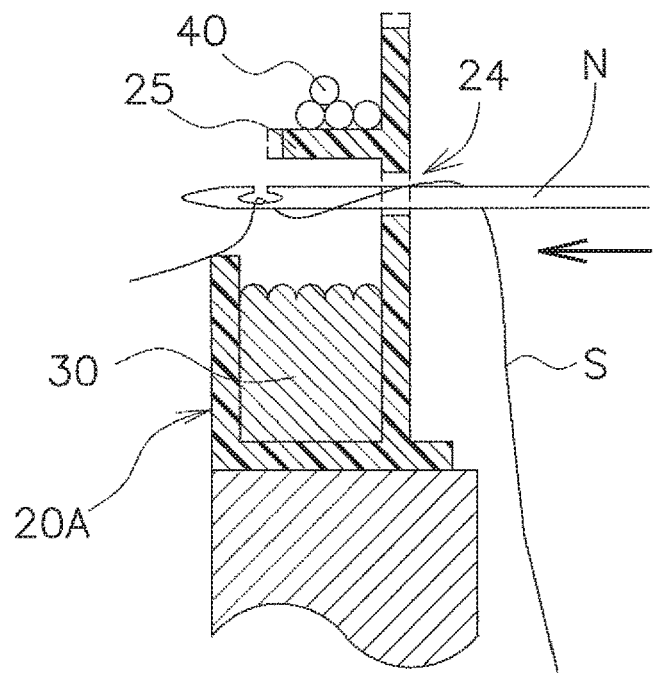
FIG. 8A shows a process for tying outgoing lines 40 with a yarn S.

Next, as shown in FIG. 8A, the yarn S is passed through the passage portion 24 with a needle N by the operator.

Figure 8B:
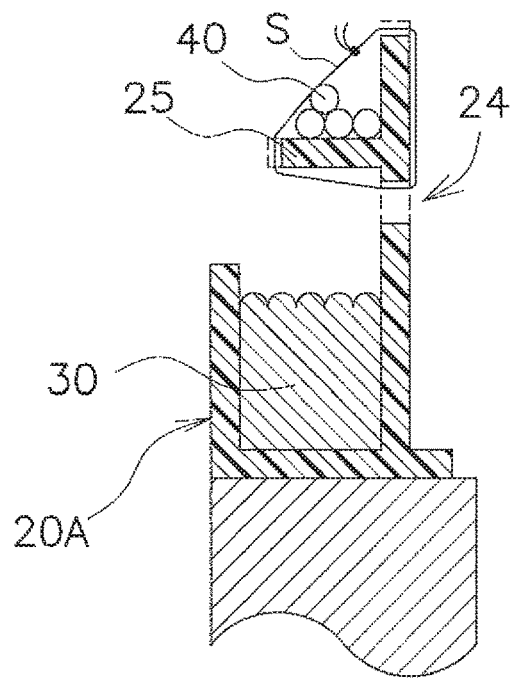
FIG. 8B shows the process for tying the outgoing lines 40 with the yarn S.

Lastly, as shown in FIG. 8B, the yarn S is tied so that the outgoing lines 40 will be restrained relative to the insulator 20A.

(4) Characteristics (4-1)

The outgoing lines 40 are spaced from the coil windings 30 by the projection portions 25. Therefore, a tying operation of the outgoing lines 40 is facilitated, which reduces the occurrence of trouble caused by the needle N when it punctures the outgoing lines 40 or the coil windings 30 to do damage to them in order to enable the occurrence of their insulation failure to be decreased.

(4-2)

A plurality of passage portions 24 and a plurality of projection portions 25 are present. Therefore, the outgoing lines 40 are able to be tied at a plurality of locations, and the outgoing lines 40 are thus further secured.

(4-3)

Each projection portion 25 is disposed above the corresponding passage portion 24.

Therefore, portions of the outgoing lines 40 that rest on the projection portions 25 are able to be secured with the yarn S passing through the passage portion 24.

(4-4)

The notch 26 engaging with the yarn S is formed on the projection portion 25. Therefore, the detachment of the yarn S from the projection portion 25 is able to be reduced.

(4-5)

The notch 27 engaging with the yarn S is formed in the vicinity of the passage portion 24 in the outer wall 21. Therefore, the misalignment of the yarn S relative to its secured position is able to be reduced.

(4-6)

Each projection portion 25 is disposed above the corresponding teeth cover portion 23. Therefore, as shown in FIG. 2, the projection portions 25 do not hide a slot 31 between adjacent coil windings 30 in the plan view. In the case where the motor 100A using such stator 50A is mounted in a compressor of an air conditioner, the hindrance to the flow of fluid refrigerant by the projection portions 25 is able to be reduced.

(4-7)

The motor 100A has the above-mentioned stator 50A. Therefore, the assembly of the motor 100A is facilitated, which is able to reduce fractures of the coil windings 30, the outgoing lines 40, and other parts.

(5) Modifications (5-1) Sectional Shape of Projection Portion 25

Figure 9:
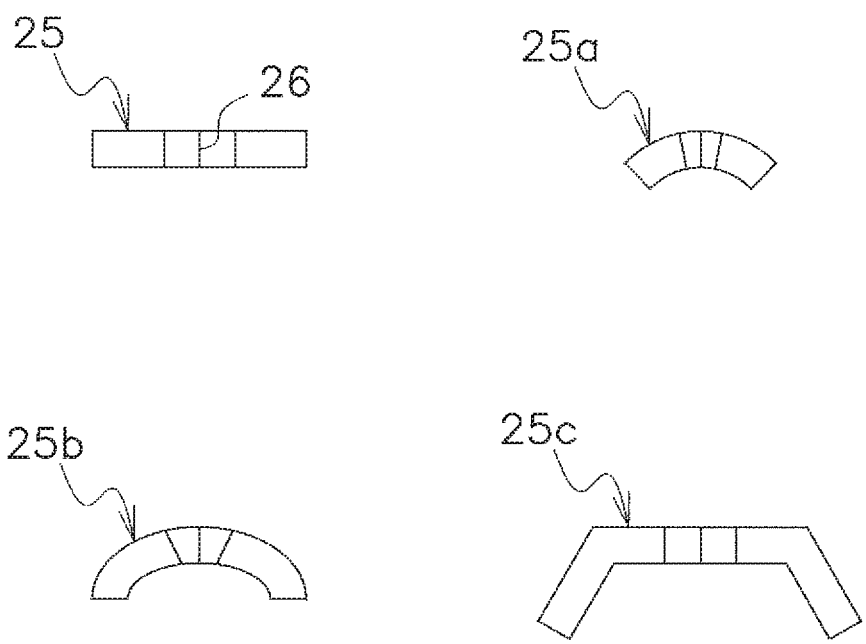
FIG. 9 is a side view showing modifications of the shape of a projection portion 25.

In the above-mentioned first embodiment, as shown in FIG. 9, the sectional shape of the projection portion 25 is rectangular. Instead of this, an upwardly projecting sectional shape may be employed such as a projection portion 25a having an arced sectional shape, a projection portion 25b having an ellipsoid arc sectional shape, and a projection portion 25c having a trapezoidal sectional shape as shown in FIG. 9.

With this configuration, strength of them is increased more than that of the flat-shaped projection portion 25.

(5-2) Shape of Passage Portion 24

Figure 10:
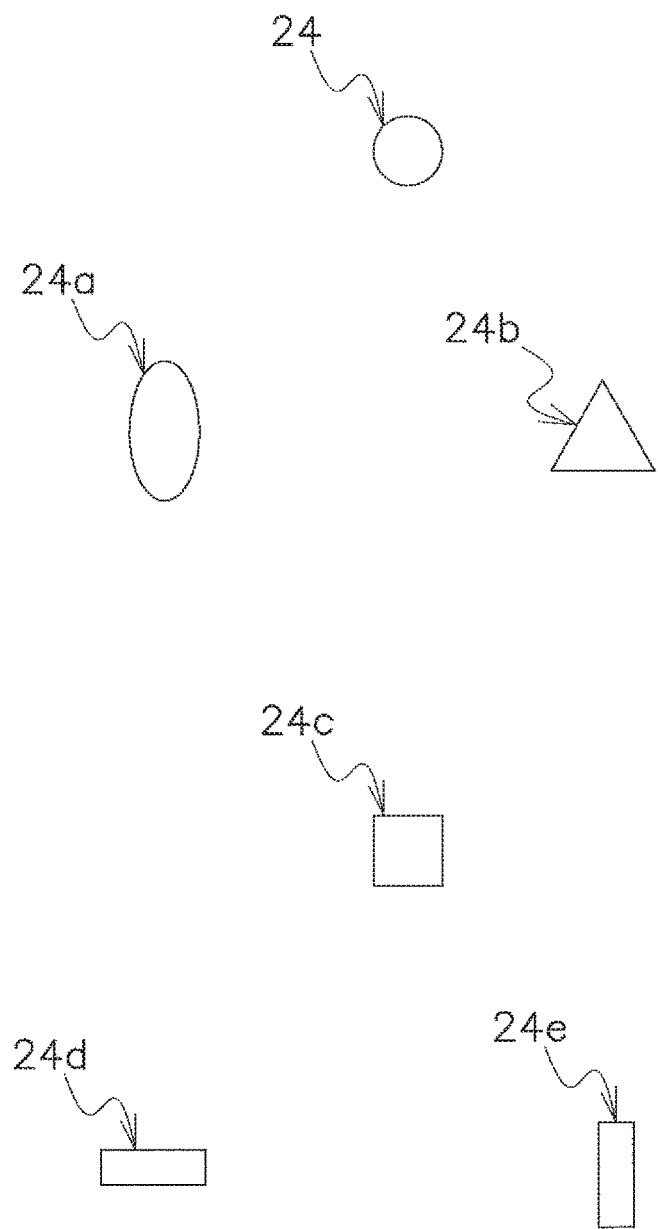
FIG. 10 is a side view showing modifications of the shape of a passage portion 24.

In the above-mentioned first embodiment, as shown in FIG. 10, the shape of the passage portion 24 is circular. Instead of this, an elliptical passage portion 24a, a triangular passage portion 24h, a square through hole 24c, or rectangular passage portions 24d and 24e as shown in FIG. 10 may be employed.

(5-3) Lower Insulator

In the above-mentioned first embodiment, as shown in FIG. 1, the lower insulator 20' having a shape different from that of the upper insulator 20A is disposed on the lower end surface 14 of the stator 50A. Instead of this, the insulator 20A may also be disposed on the lower end surface 14 of the stator 50A to secure the outgoing lines 40 on both of the upper side and the lower side of the stator 50A.

(5-4) The Number of Projection Portions 25

In the above-mentioned first embodiment, as shown in FIG. 2, the number of the projection portions 25 is the same as the number of the coil windings 30. Instead of this, the number of the projection portions 25 may be less than or more than the number of the coil windings 30.

(5-5) The Number of Passage Portions 24

In the above-mentioned first embodiment, as shown in FIG. 2, the number of the passage portions 24 has been the same as the number of the coil windings 30. Instead of this, the number of the passage portions 24 may be less than or more than the number of the coil windings 30.

(5-6) The Numbers of Teeth 11 and Coil Windings 30

In the above-mentioned first embodiment, both of the number of the teeth 11 and the number of the coil windings 30 are nine. Instead of this, the number of the teeth 11 and the number of the coil windings 30 may be six, twelve, or, other numbers.

(5-7) Configuration of Phase

Figure 11:
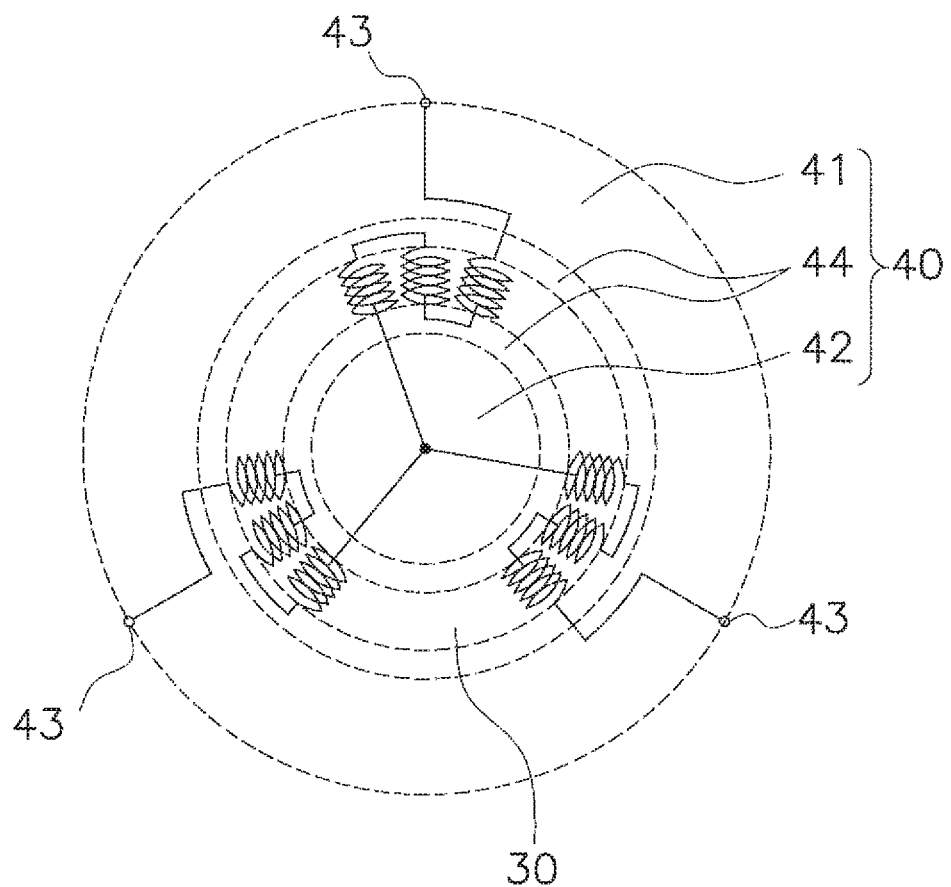
FIG. 11 is a diagram of an electrical circuit of a stator 50 of a motor according to a modification of the first embodiment of the present invention.

In the above-mentioned first embodiment, the coil windings 30 constituting each phase are connected in parallel as shown in FIG. 7, Instead of this, the coil windings 30 constituting each phase may be connected in series as shown in FIG. 11. In this case, the outgoing lines 40 include not only the power line 41 and the neutral line 42 but also coil connection lines 44 connecting two coil windings 30.

<Second Embodiment>

(1) Overall Configuration

Figure 12:
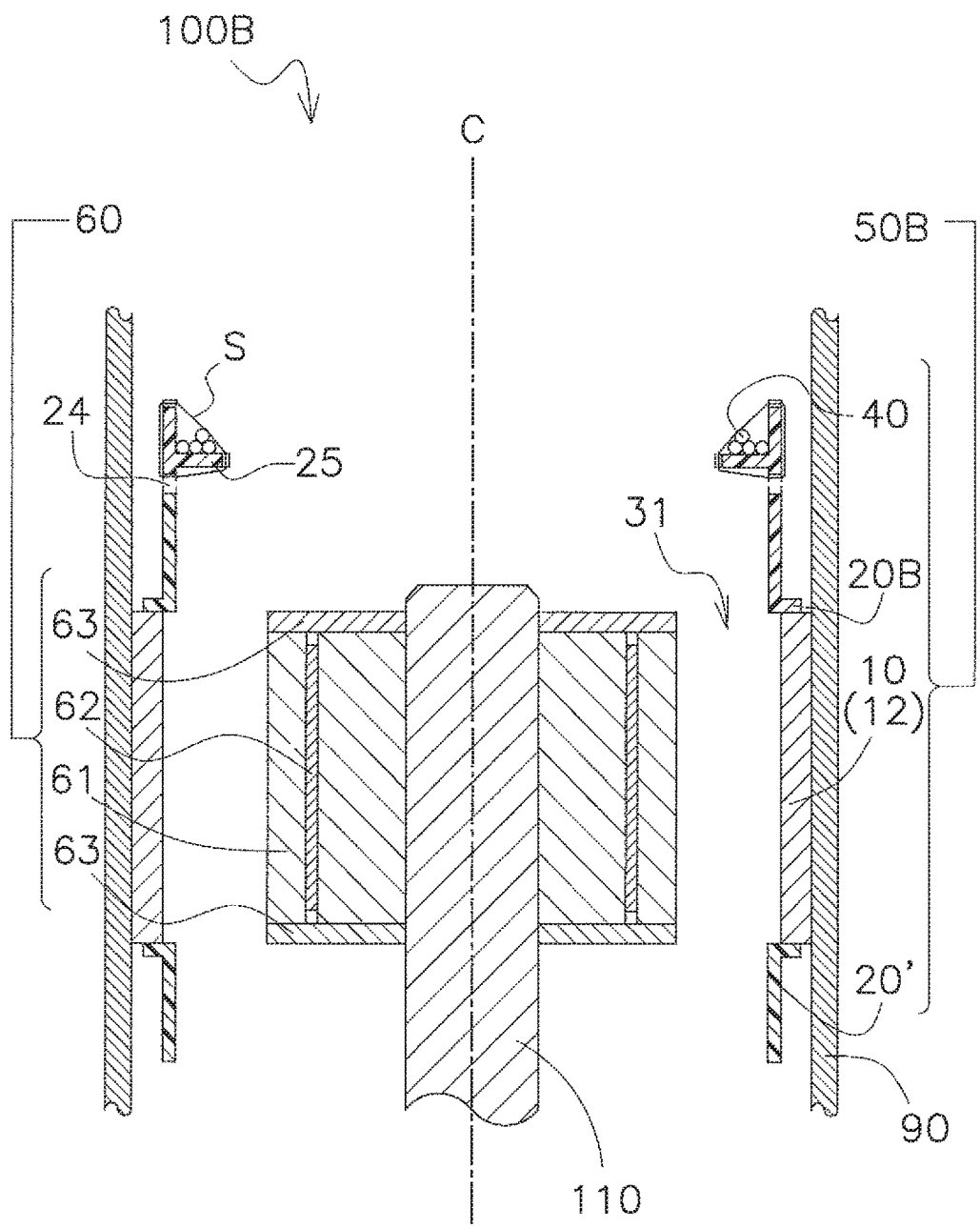
FIG. 12 is a sectional view of a motor 100B according to a second embodiment of the present invention.

FIG. 12 is a sectional view of a motor 100B according to a second embodiment of the present invention. The motor 100B is different from the motor 100A according to the first embodiment in that it is provided with an insulator 20B having a shape different from that of the insulator 20A used in the motor 100A according to the first embodiment. Same reference numerals refer to configuration elements similar to those in the first embodiment.

The motor 100E is provided with a stator 50B having the insulator 20B and the rotor 60 attached to the shaft 110.

(2) Detailed Configuration (2-1) Stator 50B

As shown in FIG. 12, the stator 50B is provided with the stator core 10, the upper insulator 20B, the lower insulator 20', the coil windings 30, the outgoing lines 40, and the yarn S.

Figure 13:
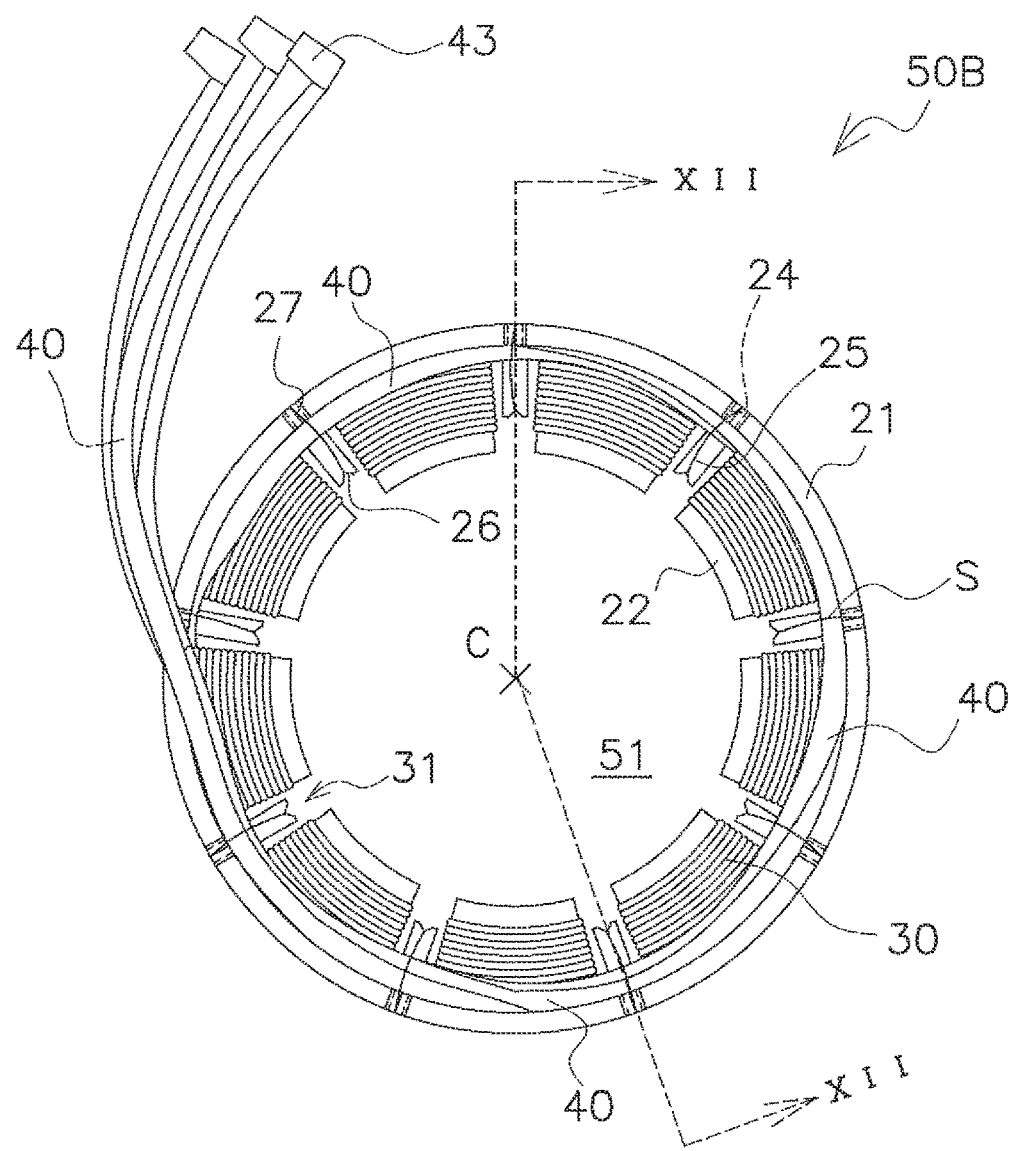
FIG. 13 is a plan view of a stator 50B of the motor according to the second embodiment of the present invention.

FIG. 13 is a plan view of the stator 50B. The plane along the line XII-XII in this figure corresponds to the portion of the stator 50B in the sectional view of FIG. 12.

(2-2) Upper Insulator 20B

Figure 14:
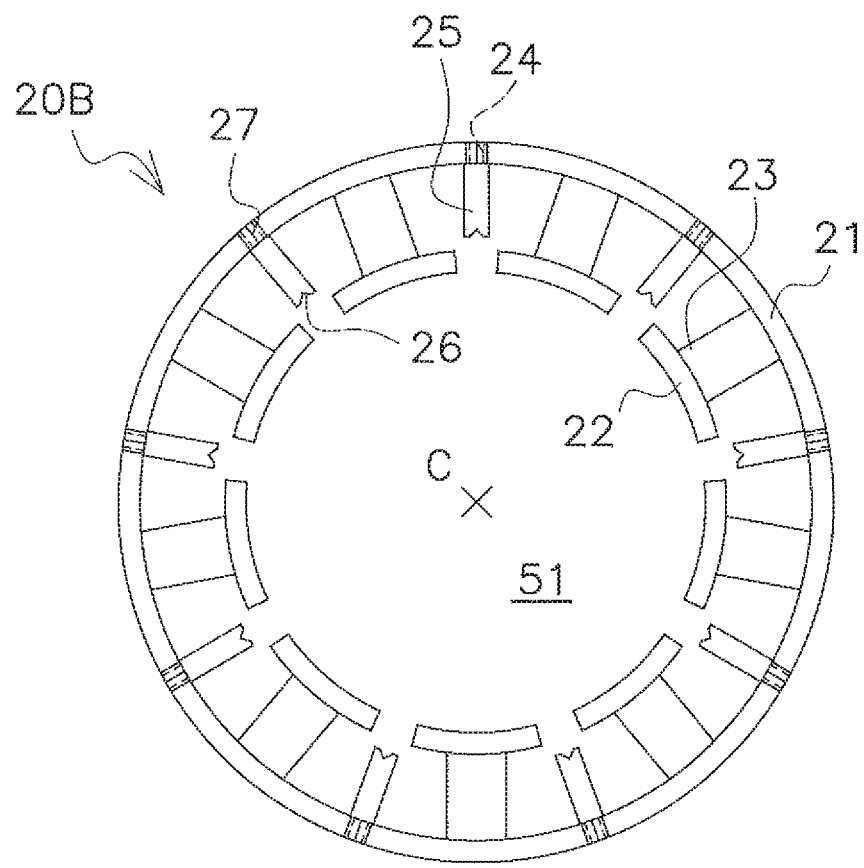
FIG. 14 is a plan view of an insulator 20B of the motor according to the second embodiment of the present invention.

FIG. 14 is a plan view of the upper insulator 20B. The insulator 20B has the cylindrical outer wall 21, the teeth cover portions 23 extending from the outer wall 21 toward the central axis C, and the inner walls 22 which are each disposed at a distal end of each of the teeth cover portions.

Furthermore, the insulator 20A has a plurality of projection portions 25 extending from the outer wall 21 toward the central axis C.

Figure 15:
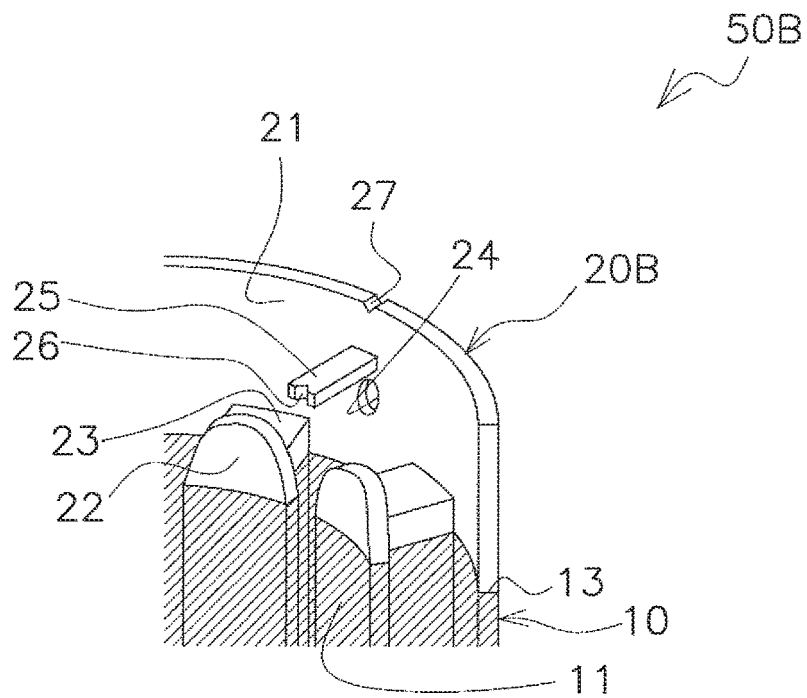
FIG. 15 is a perspective view of the insulator 20B placed on the stator core 10.

FIG. 15 shows the insulator 20B placed on the stator core 10.

Each of the projection portions 25 is located above and between two adjacent teeth cover portions 23.

A passage portion 24 is disposed at a location below each projection portion 25 in the outer wall 21.

A notch 27 is disposed at a location at the upper end of the outer wall 21 corresponding to a base of each projection portion 25.

(2-3) Coil Winding 30

Figure 16:
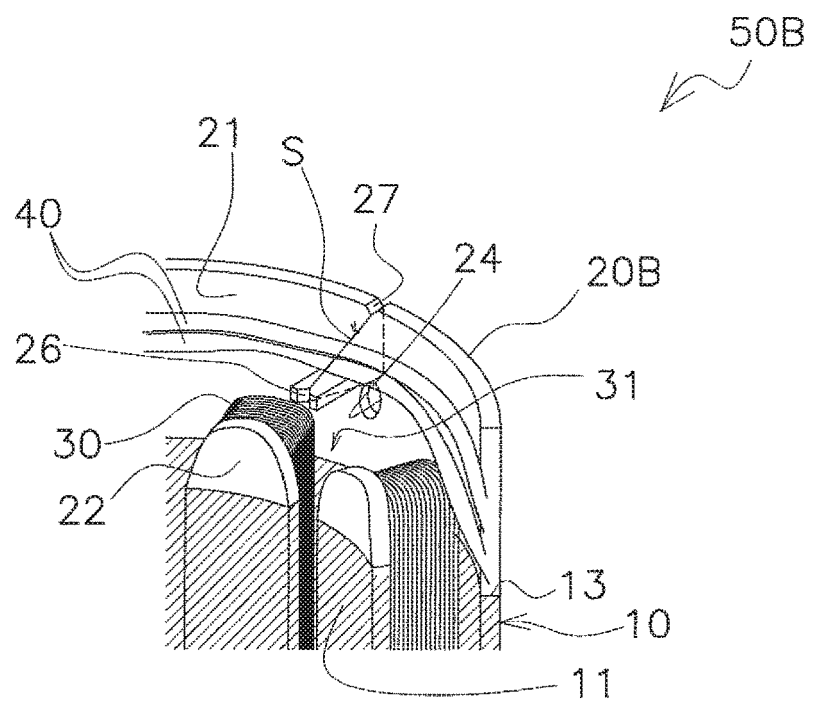
FIG. 16 is a perspective view of the stator 50B of the motor according to the second embodiment of the present invention.

FIG. 16 shows the stator 50B to which the coil windings 30 are attached. The coil windings 30 pass on the corresponding teeth cover portions 23 (FIG. 15) and between the outer wall 21 and the corresponding inner walls 22.

(2-4) Outgoing Line 40 and Yarn S

As shown in FIG. 16, the outgoing lines 40 rest on the projection portions 25, and are tied with the yarn S passing through the passage portion 24 to be restrained. The yarn S engages with the corresponding notch 26 at a distal end of the projection portion 25 and the corresponding notch 27 at the upper end of the outer wall 21 to be constrained.

(3) Characteristics

Each projection portion 25 is disposed between two adjacent teeth cover portions 23. Therefore, low is the likelihood of the interference of the projection portions 25 with the movement of winding nozzles for winding the coil windings around the teeth.

(4) Modification

The modifications of the first embodiment may be applied to the present embodiment.

<Third Embodiment>

Figure 17:
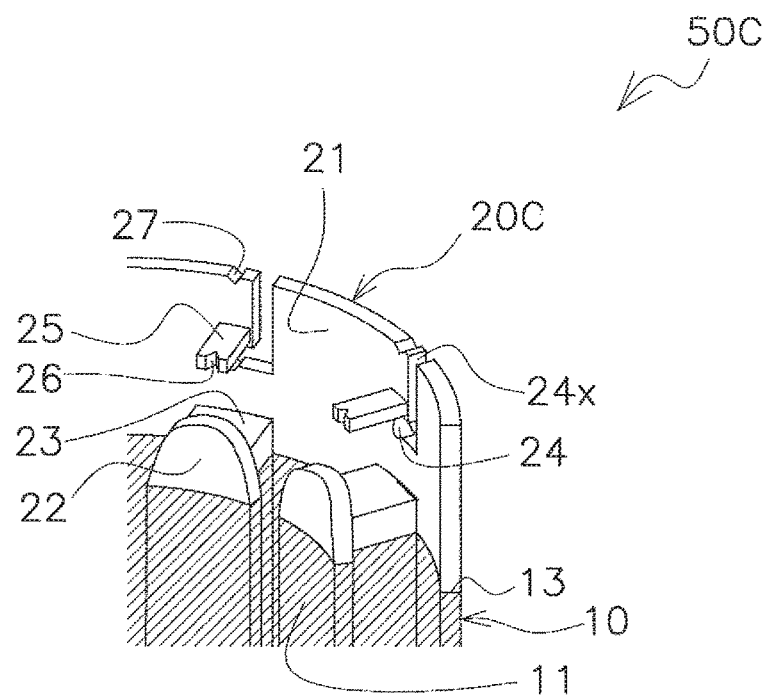
FIG. 17 is a perspective view of an insulator 20C placed on the stator core 10 of a stator 50C of a motor 100C according to a third embodiment of the present invention.

FIG. 17 shows a stator 50C with which a motor 100C according to a third embodiment of the present invention is provided. An insulator 20C of the stator 50C has a passage portion 24 having a configuration different from that of the passage portion 24 of the insulator 20A of the motor 100A according to the first embodiment. Same reference numerals refer to configuration elements similar to those in the first embodiment.

In the present embodiment, the passage portion 24 is connected to a gap portion 24x. This gap portion 24x is open at the upper end of the insulator 20C. With this configuration, an operation for passing the yarn S through the passage portion 24 with the needle N can be facilitated.

The modifications of the first embodiment may be applied to the present embodiment.

<Fourth Embodiment>

Figure 18:
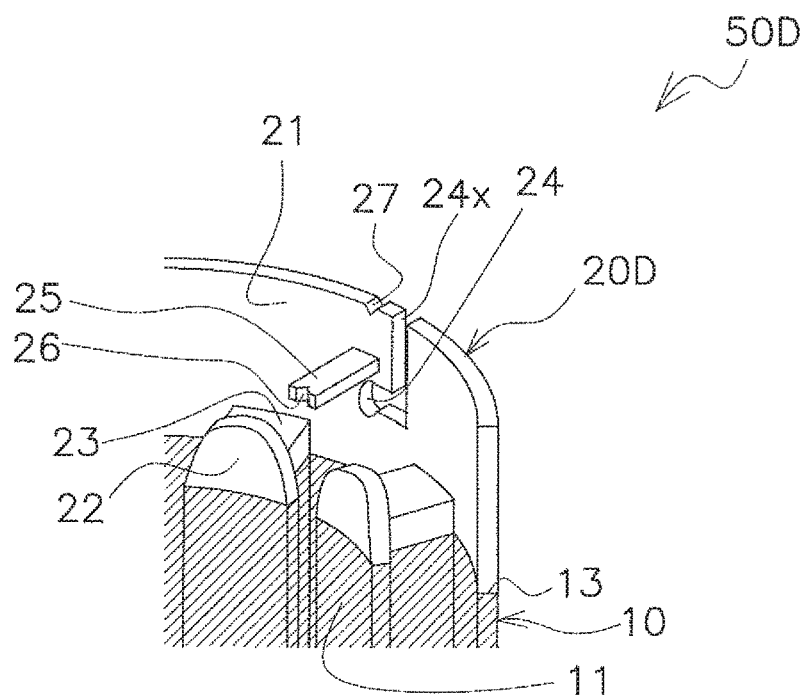
FIG. 18 is a perspective view of an insulator 20D placed on the stator core 10 of a stator 50D of a motor 100D according to a fourth embodiment of the present invention.

FIG. 18 shows a stator 50D with which a motor 100D according to a fourth embodiment of the present invention is provided. An insulator 20D of the stator 50D has a passage portion 24 having a configuration different from that of the passage portion 24 of the insulator 209 of the motor 100B according to the second embodiment. Same reference numerals refer to configuration elements similar to those in the second embodiment.

In the present embodiment, similarly to the third embodiment, the passage portion 24 is connected to a gap portion 24x. This gap portion 24x is open at the upper end of the insulator 20D. With this configuration, an operation for passing the yarn S through the passage portion 24 with the needle N can be facilitated.

The modifications of the first embodiment may be applied to the present embodiment.

<Fifth Embodiment>

(1) Overall Configuration

Figure 19:
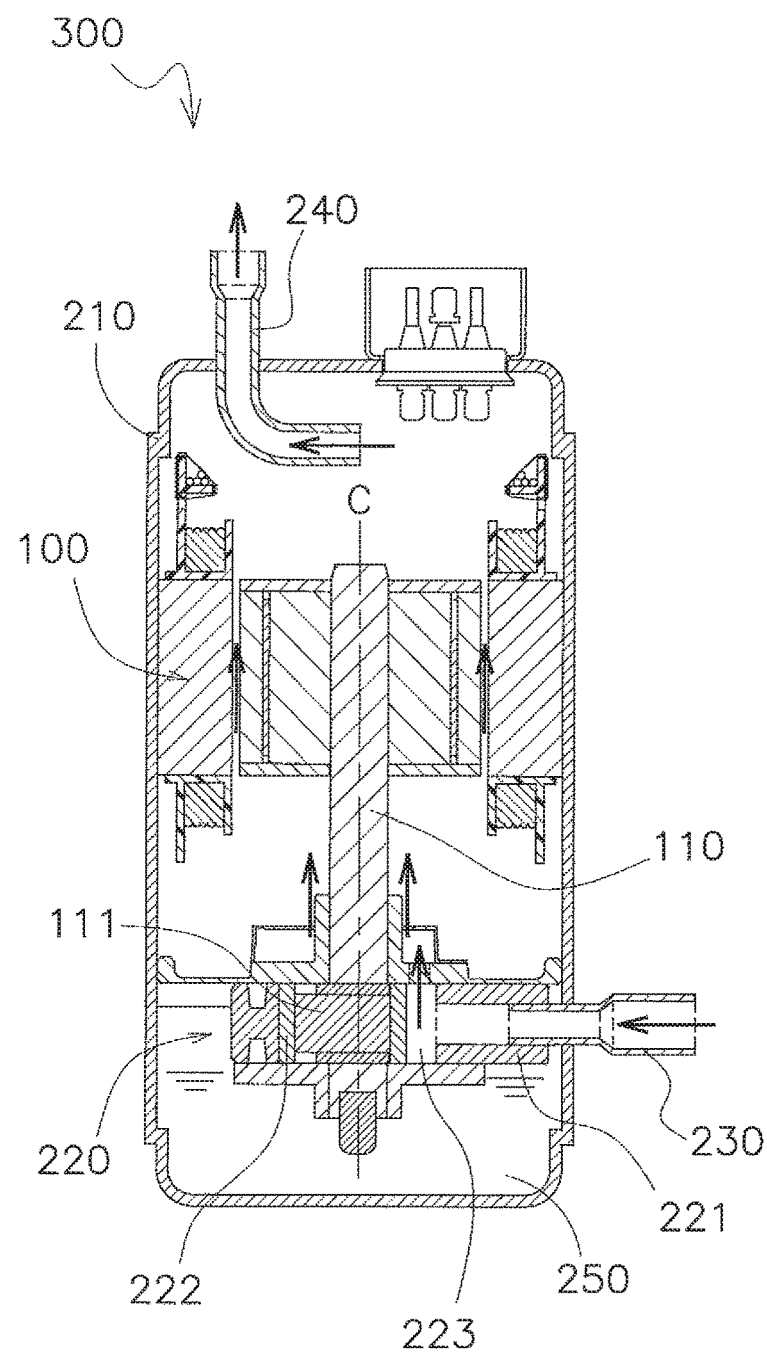
FIG. 19 is a sectional view of a compressor 300 according to a fifth embodiment of the present invention.

FIG. 19 is a sectional view of a compressor 300 according to a fifth embodiment of the present invention. The compressor 300 is mounted in an air conditioning apparatus or the like, and is used to compress fluid refrigerant and the like.

The compressor 300 is provided with a motor 100, the shaft 110, a pressure vessel 210, a fluid compression mechanism 220, a suction pipe 230, a discharge pipe 240, and a lubrication oil reservoir portion 250.

(2) Detailed Configuration (2-1) Pressure Vessel 210

The pressure vessel 210 is able to withstand high pressure and houses other components of the compressor 300.

(2-2) Motor 100

The motor 100 is the motor 100A according to the first embodiment, the motor 100B according to the second embodiment, the motor 100C according to the third embodiment, the motor 100D according to the fourth embodiment, or motors according to their modifications. The pressure vessel 210 doubles as the casing 90 of the motor 100 (FIGS. 1 and 12)

(2-3) Shaft 110

The shaft 110 transmits power of the motor 100 to the fluid compression mechanism 220 and has an eccentric portion 111.

(2-4) Fluid Compression Mechanism 220

The fluid compression mechanism 220 compresses fluid with the power of the motor 100 and has a cylinder 221 and a piston 222. The cylinder 221 and the piston 222 define a compression chamber 223. The piston 222 is disposed at the eccentric portion 111 of the shaft 110. When the shaft 110 rotates, the piston 222 moves to vary a volume of the compression chamber 223. Thus, the fluid is compressed.

(2-5) Suction Pipe 230

The suction pipe 230 guides the fluid before compression to the fluid compression mechanism 220.

(2-6) Discharge Pipe 240

The discharge pipe 240 guides the fluid after compression to the outside of the pressure vessel 210.

(2-7) Lubrication Oil Reservoir Portion 250

The lubrication oil reservoir portion 250 stores lubrication oil for lubricating the fluid compression mechanism 220 and other mechanisms.

(3) Characteristics

The compressor 300 has the stator 50A, the stator 50B, the stator 50C, or the stator 50D as mentioned above. Therefore, the assembly of the compressor 300 is facilitated, which is able to reduce fractures of the coil windings 30, the outgoing lines 40, and other parts.

INDUSTRIAL APPLICABILITY

The present invention is widely applicable to motors used in all technical fields. Furthermore, the present invention is also applicable to compressors mounted in air conditioning apparatuses.

What is claimed is:

1. A stator having a central axis, the stator comprising:
   a core having a plurality of teeth radially inwardly extending toward the central axis;
   an insulator placed on an end surface of the core;
   a plurality of coil windings, the coil windings each wound around one of the teeth;
   outgoing lines extending from both ends of each of the coil windings; and
   a yarn securing the outgoing lines to the insulator,
   the insulator having
      an outer wall surrounding the central axis and erected in such a way as to upwardly extend from the end surface,
      a plurality of teeth cover portions radially inwardly extending from the outer wall toward the central axis, and
      a plurality of inner walls, the inner walls each being erected at an end portion of one of the teeth cover portions,
   the coil windings being placed between the outer wall and corresponding inner walls,
   at least one passage portion formed in the outer wall to pass the yarn, and
   the insulator further having at least one projection portion spacing the outgoing lines from the coil windings and securing the outgoing lines, the at least one projection portion radially inwardly extending from the outer wall.

2. The stator according to claim 1, wherein
   the at least one passage portion includes a plurality of passage portions, and the at least one projection portion includes a plurality of projection portions.

3. The stator according to claim 2, wherein each of the projection portions is disposed above any one of the passage portions.

4. The stator according to claim 1, wherein a notch engageable with the yarn is disposed at a distal end of the projection portion.

5. The stator according to claim 1, wherein a notch engageable with the yarn is disposed at a location above the passage portion in the outer wall.

6. The stator according to claim 1, wherein the projection portion is disposed between two adjacent teeth cover portions of the teeth cover portions as seen from above.

7. The stator according to claim 1, wherein the projection portion is disposed in such a way as to at least partly overlap one of the teeth cover portions as seen from above.

8. The stator according to claim 1, wherein the projection portion has an upwardly projecting sectional shape.

9. The stator according to claim 8, wherein the sectional shape is an arc, an ellipsoid arc, or a trapezoid.

10. The stator according to claim 1, wherein the passage portion has a circular, an elliptical, or a triangular shape.

11. A motor including the stator according to claim 1, the motor further comprising a rotor magnetically interacting with the stator.

12. A compressor including the motor according to claim 11, the compressor further comprising:
a shaft allowed to rotate by the motor;
a fluid compression mechanism compressing fluid with rotation of the shaft; and
a pressure vessel housing the motor, the shaft, and the fluid compression mechanism.

13. The stator according to claim 2, wherein a notch engageable with the yarn is disposed at a distal end of each projection portion.

14. The stator according to claim 2, wherein a notch engageable with the yarn is disposed at a location above each passage portion in the outer wall.

15. The stator according to claim 2, wherein each projection portion is disposed between two adjacent teeth cover portions of the teeth cover portions as seen from above.

16. The stator according to claim 2, wherein each projection portion is disposed in such a way as to at least partly overlap one of the teeth cover portions as seen from above.

17. The stator according to claim 2, wherein each projection portion has an upwardly projecting sectional shape.

18. The stator according to claim 17, wherein the sectional shape is an arc, an ellipsoid arc, or a trapezoid.

19. The stator according to claim 2, wherein each passage portion has a circular, an elliptical, or a triangular shape.

* * * * *